(12) United States Patent
Lagler et al.

(10) Patent No.: US 7,073,679 B1
(45) Date of Patent: Jul. 11, 2006

(54) CLOSED INJECTION MOULDED CLOSURE PROVIDING MATING UPPER AND LOWER PARTS COUPLED BY INTEGRALLY FORMED HINGE CONNECTIONS

(75) Inventors: Louis Lagler, Zurich (CH); Rudolf Rentsch, Meilen (CH)

(73) Assignee: Creanova AG, Baar (CH)

( * ) Notice: Subject to any disclaimer, the term of this patent is extended or adjusted under 35 U.S.C. 154(b) by 0 days.

(21) Appl. No.: 09/890,154

(22) PCT Filed: Oct. 30, 1999

(86) PCT No.: PCT/CH99/00510
§ 371 (c)(1),
(2), (4) Date: Oct. 23, 2001

(87) PCT Pub. No.: WO00/44638
PCT Pub. Date: Aug. 3, 2000

(30) Foreign Application Priority Data
Jan. 27, 1999 (WO) .................. PCT/IB99/00277

(51) Int. Cl.
*B65D 43/18* (2006.01)
*B29C 45/00* (2006.01)

(52) U.S. Cl. ............... 220/259; 215/237; 215/253; 264/328.8; 220/266; 220/838; 220/837

(58) Field of Classification Search .......... 220/281, 220/257.1, 259.1, 266, 827, 836–837, 838, 220/839; 215/237, 235, 253, 258; 222/556; 264/268, 328.8
See application file for complete search history.

(56) References Cited

U.S. PATENT DOCUMENTS

| 4,403,712 | A | | 9/1983 | Wiesinger |
| 4,638,916 | A | | 1/1987 | Beck et al. |
| 4,826,026 | A | * | 5/1989 | Gach et al. ............... 215/206 |
| 4,934,556 | A | | 6/1990 | Kleissendorf |
| 5,148,912 | A | * | 9/1992 | Nozawa ................... 220/838 |
| 5,270,011 | A | * | 12/1993 | Altherr ..................... 422/102 |
| 5,335,802 | A | * | 8/1994 | Brach et al. .............. 215/235 |
| 5,392,938 | A | * | 2/1995 | Dubach .................... 215/254 |
| 5,683,016 | A | * | 11/1997 | Santagiuliana ......... 222/153.14 |
| 5,794,308 | A | | 8/1998 | Rentsch et al. |
| 5,984,123 | A | * | 11/1999 | Mogami et al. .......... 215/235 |
| 6,071,477 | A | | 6/2000 | Auclair et al. |
| 6,347,716 | B1 | * | 2/2002 | Nofer et al. ............... 215/235 |

FOREIGN PATENT DOCUMENTS

EP    0 746 512    *  8/1995
FR    2 715 381       7/1995

* cited by examiner

*Primary Examiner*—Robin Hylton
(74) *Attorney, Agent, or Firm*—Robert E. Bushnell, Esq.

(57) ABSTRACT

A closed injection moulded plastic closure (20) having a first closure part and a second closure part (22). The first closure part is connected to the second closure part by snap-on hinged connection. The first and second closure parts have no main hinged connection with each other, but are connected to one another by two connecting elements and four hinged connections bordering the two connecting elements on nonadjacent sides. Coupling elements may serve as an original warranty seal for indicating opening for the first time. If required, a catch and a counter-element serve as a locking mechanism and prevent unintentional opening of the closure.

45 Claims, 3 Drawing Sheets

CLOSED INJECTION MOULDED CLOSURE PROVIDING MATING UPPER AND LOWER PARTS COUPLED BY INTEGRALLY FORMED HINGE CONNECTIONS

The present invention relates to a closed injection moulded closure according to the precharacterizing clause of independent Patent claim 1.

The prior art discloses various plastics closures having snap-on hinges.

To enable them to function, they must, for technical reasons, generally be produced in the open position. For cost reasons, however, attempts have been made to injection mould such closures in the closed state, especially to reduce the mould cost and the production costs, inter alia with avoidance of the so-called covering process. Closed injection moulded closures are accordingly advantageous as they are cheaper, permit a simpler mould and furthermore offer the opportunity of integrating an original warranty seal without substantial additional cost. Examples of suitable original warranty seals are tear-off lips or weak points in the form of thin connecting webs. These tear-off lips or thin areas must be removed or deliberately destroyed on opening for the first time. Particularly in the case of foods, medicaments or products for infants, product safety is having to meet increasing legal requirements, which further increases the interest in corresponding closures having original warranty seals.

The prior art discloses individual one-part closed injection moulded closures which however are not convincing in their mode of operation. Mainly owing to too small an opening angle, a poor snap-on effect and inadequate design as well as insufficient sealing, these closures have not become established on the market. In the opened position, the movable closure part is in such an unfavourable position that it constantly and unavoidably comes into contact with the contents and thus becomes soiled.

Moreover, this closure part is so close to the pouring opening that it blocks the opening visually. From the point of view of injection moulding, these closures are not without problems. Asymmetrical flow paths, an unfavourable arrangement of the film hinges and cooling problems are only a few of the problems. Owing to the system itself, these disadvantages cannot be overcome. In particular, the main hinge connections between the closure parts, which force the closure parts to form a rotational movement and limit the kinematics of closure are troublesome and particularly disadvantageous.

For example, EP 0 532 471 describes a closure which has the disadvantages described above. The lower closure part is connected to the movable upper closure part by means of a main hinge connection and two laterally arranged tension bands. The hinge connections and the tension bands must be arranged in such a way that they are on the one hand capable of being removed from the mould and are accessible from both sides (outside and inside). The unavoidable main hinge connection results in the closure parts having to be arranged very close together, with the correspondingly adverse effect on the opened state. The accessibility of the hinge region, which is essential for production, moreover means that the tension bands cannot be designed in any desired manner and the angle between open and closed positions remains in the region of 80° or less. In addition, the upper closure part in the open position is in a poor, unstable and random arrangement relative to the spout. An insufficient snap-on effect and the absolutely unfavourable position of the upper closure part relative to the lower closure part in the opened position are obstacles to effective operation. Problems with the flow paths and poor design during moulding are further weaknesses. The main hinge connection moreover results in the closure parts moving along circular paths and therefore being subject to considerable restrictions with regard to the spatial arrangement.

The disadvantages described above cannot be overcome by means of the conventional closures which are known from the prior art.

It is therefore an object of the present invention to provide a closed injection moulded closure which does not have the disadvantages known from the prior art and which has a large, adjustable opening angle and a substantial snap-on effect. It is also an object of the present invention to provide a closure in which the movable closure part in the open position can be arranged so that it is away from the mouth region of the spout. In addition, the closure should, if desired, offer the possibility of being child-proof and secure during transport and should provide a good seal even in the case of contents with gas pressure.

These and other objects may be achieved by the invention in the Patent Claims.

The invention disclosed here avoids in advance the bottlenecks to which constructions according to the prior art are subject, by deliberately avoiding a main hinge connection between the closure parts. The movable closure part is positioned outside the zone of the spout or opening. Consequently, soiling of the movable closure part by the contents and visual and functional blocking are prevented. The snap-on effect is established and predetermined in a specific manner in line with the requirements. Owing to the absence of a main hinge, it is also possible for the first time to realize substantially symmetrical flow paths in the hinge region in the case of closed injection moulded closures. As a result of this, problems such as material backflow and cold welds do not occur.

Because the connection lacks a main hinge, it is furthermore achieved that the closure parts no longer move along circular paths relative to one another. The spatial trajectories instead correspond to adjustable movement paths which are adapted to the respective requirements. High spouts and other obstacles are overcome in a specific manner. The invention envisages that closed injection moulded closures can be produced with avoidance of the known disadvantages, with or without original warranty seals and with a good design. If desired in a specific case, child-proof properties and security during transport as well as particular sealing in the case of contents with gas pressure can be provided.

Embodiments of the invention are explained in more detail with reference to the following Figures.

Figures 1, 2:
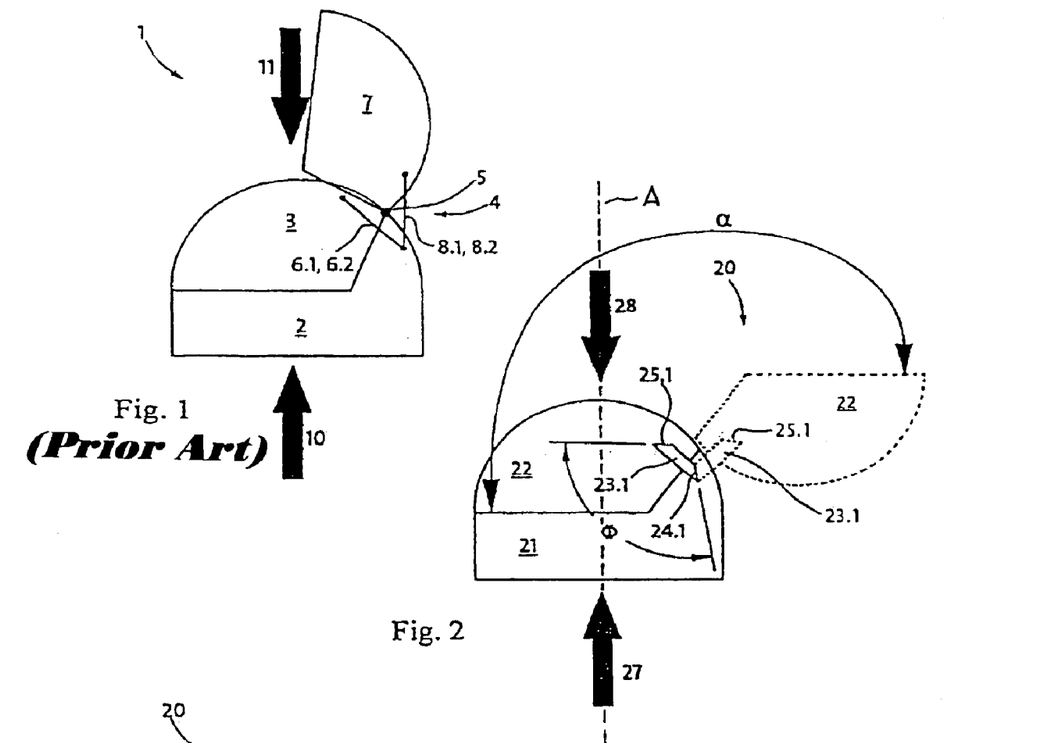
FIG. 1 schematically shows a closure according to the prior art.
FIG. 2 schematically shows a closure according to; the invention disclosed here.

FIG. 1 shows a schematic side view of a closed injection moulded closure 1, as known from the prior art. A lower closure part 2 and a movable upper closure part 3 can be seen. The upper closure part 3 is connected to the lower closure part 2 by means of a conventional snap-on hinge 4. The snap-on hinge 4 consists of a main hinge connection 5 and two tension bands 6.1 and 6.2 (because of the direction of view, only the tension band 6.1 is visible here) which each connect the lower closure part 2 to the upper closure part 3 and as a rule are arranged by the side of the main hinge connection 5. Instead of tension bands 6.1, 6.2, there are also other known elements, such as toggle levers, etc., which are not used in practice in closed injection moulded closures owing to various disadvantages. The main hinge connection 5 forms a direct hinge connection with only one hinge axis between the lower closure part 2 and the upper closure part 3. This hinge axis of the main hinge connection 5 is parallel to the direction of view in the representation shown here. Owing to the main hinge connection 5 having a hinge axis, all parts rotate relative to one another along circular paths. In order to be able to produce the closure 1 in the closed position of the upper closure part 3, the main hinge connection 5 and tension bands 6.1, 6.2 and in particular their connections to the closure parts 2 and 3 must be arranged in such a way that they are accessible in the injection mould (not shown) from the inside of the closure (arrow 10) and from the outside of the closure (arrow 11). Particularly the main hinge is difficult to form. Owing to these facts, the function (snap-on effect) and the arrangement (open position) of the upper closure part in the case of the closures known from the prior art are very restricted and inadequate. A typical open position of the upper closure part 3 is represented by an upper closure part 7. The open position of the tension bands 6 is represented by tension bands 8.1, 8.2 (only one can be seen). Owing to the unavoidable main hinge connection 5 in this closure concept, the closure 1 shown here has a small opening angle of about 80° and a poor snap-on effect.

FIG. 2 schematically shows a closed injection moulded closure 20 according to the invention disclosed here. The closure 20 consists of a lower closure part 21 and an upper closure part 22, which is shown here in the closed position in which it is also produced. According to the invention, the closure 20 shown here has (in contrast to the prior art) no main hinge connection (see FIG. 1) between the closure parts 21 and 22. The closure parts 21 and 22 are instead actively connected to one another by two, preferably symmetrically formed, connecting elements 23.1 and 23.2 (owing to the direction of view, only one connecting element 23.1 is visible) and four hinge connections 24.1, 24.2, 25.1 and 25.2. The two connecting elements 23.1 and 23.2 are connected to the upper closure part 22 through first hinge connections 25.1 and 25.2 and to the lower closure part 21 through second hinge connections 24.1 and 24.2. The first hinge connection and the second hinge connection make an angle φ with each other. Two planes defined by the two pairs of hinge connections 24.1 and 25.1, and 24.2 and 25.2, respectively (not shown) in turn make an angle ω By varying the angles ω and φ and their ratio to one another, the snap-on effect and an opening angle α of the closure are determined. The relationship between the opening angle α and the angles ω and φ is given by the following formula:

$$\phi = 2 \cdot \arctan\left[\frac{\sin(\alpha/2)}{1 - \cos(\alpha/2)} \cdot \sin(\omega/2)\right]$$

To be able to produce the closure 20 in the closed position, the connecting elements 23.1 and 23.2 and the hinge connections 24.1, 24.2, 25.1 and 25.2 are arranged in such a way that they are accessible in the mould from the inside of the closure (arrow 27) and from the outside of the closure (arrow 28) and can be removed from the mould. For this purpose, the connecting elements 23.1, 23.2 and the associated hinge connections are arranged in a surface which is inclined relative to the closure axis "A". Preferably, hinges according to the patents EP 0 746 512, PCT/EP96/2780 or the Patent application PCT/1999/00277 of the same Applicant are used for the closure, the contents of which are hereby incorporated by reference with regard to the details of the design of the hinges.

Particularly in the case of closures having curved contours in which the connecting elements 23.1, 23.3 have a corresponding convexity or curvature owing to their contour integration, the hinge according to PCT/EP96/2780 is advantageous since the elastic strain of the longer free edges 46.1 and 46.2. (See FIG. 3) under tension has the desired snap-on effect.

A typical open position of the upper closure part 22 is represented by the dotted line in FIG. 2. By avoiding a main hinge connection between the closure parts 21 and 22, it is possible to arrange the upper closure part 22 in its open position in such a way that an optimal and, if required, predeterminable opening angle and an adjustable snap-on effect result. The predetermined opening angle is preferably in the range from 150° to 180° but may also be adapted to other requirements. On comparison of the closures shown in FIG. 1 (prior art) and FIG. 2, the surprising importance of the invention disclosed here for closures produced in the closed state will become clear to the person skilled in the art.

Figure 3:
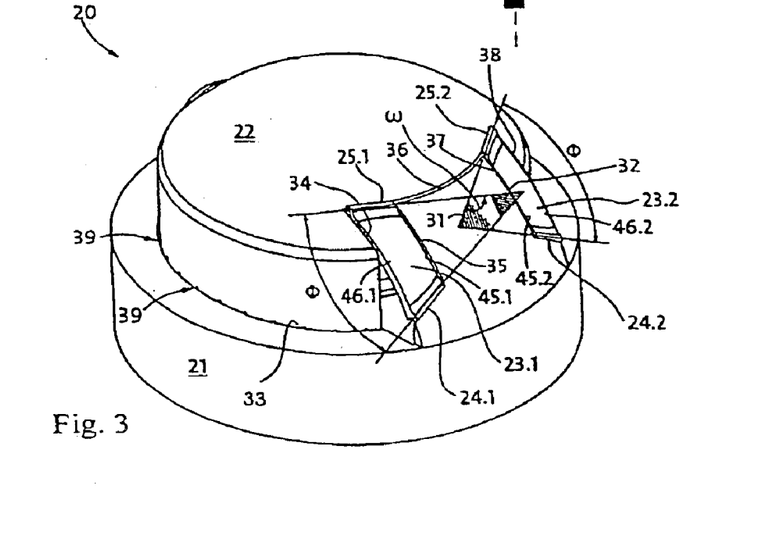
FIG. 3 shows a preferred embodiment of a closure according to the invention.

FIG. 3 shows an embodiment of a closure 20 according to the invention in a perspective view. A lower closure part 21 and an upper closure part 22 can be seen. These are connected to one another by means of two connecting elements 23.1 and 23.2 and four hinge connections 24.1, 24.2 and 25.1, 25.2. The two pairs of hinge connections 24.1 and 25.1, and 24.2 and 25.2, respectively, define a first plane 31 and a second plane 32, respectively, and make an angle φ, with each other. Shorter free edges 45.1 and 45.2 closer to the apex of the angle are preferably substantially pressure-resistant. The planes 31 and 32 in turn make a solid angle ω with one another. The planes 31 and 32 are inclined relative to the closure axis "A" in such a way that they are further away from the closure axis "A" in the region of the lower connection (lower closure part 21) than in the region of the upper connection (upper closure part 22). This permits demouldability of the closure while also making it possible to form the desired hinge. In the embodiment shown, the connecting elements 23.1, 23.2 are integrated into a convex outer contour of the closure, with an included angle ω of less than 180° between the planes 31 and 32. In other embodiments having a concave outer contour, an included angle ω of greater than 180° is enclosed between the two planes 31, 32. The hinge connections 24.1, 24.2 and 25.1, 25.2 are preferably film hinges as known from the prior art. The desired bending ranges can however also be different. In the closed position shown here, the closure 20 is preferably produced by means of injection moulding. The closure parts 21, 22 and the connecting elements 23.1, 23.2 and the hinge connections 24.1, 24.2, 25.1, 25.2 are functionally separated from one another here by intervening gaps 33 to 38 so that the movable upper closure part 22 can assume at least two spatially defined and stable positions relative to the lower closure part 21. There are unstable states (dead points) between these stable positions so that the upper closure part 22 automatically attempts to achieve the nearest stable position and hence has a snap-on effect. In certain stable positions, in particular in the closed position of the closure 20 shown here, the closure parts 21, 22, the connecting elements 23.1, 23.2, the hinge connections 24.1, 24.2, 25.1, 25.2 are in substantially stress free states (geometric deformations). In addition to these stress-free, stable positions, non-stress-free stable positions are also possible. In these positions, the connecting elements 23.1 and 23.2 and the hinge connections 24.1, 24.2, 2S.1, 25.2 are typically under a torsional stress and the secondary stresses caused thereby. The connecting elements 23.1 and 23.2 are formed along a shorter free edge 45.1 or 45.2 in such a way that they do not buckle under the pressures occurring. The longer free edges 46.1 and 46.2 are preferably designed in such a way that they lengthen elastically and reversibly under the tensile stresses occurring. This can be achieved, for example, by a three-dimensional curvature or specific choice of material. The closure parts 21 and 22 advantageously have a certain elasticity so that, if required, they undergo reversible elastic deformation under the loads occurring. The connecting elements 23.1 and 23.2 are advantageously formed in such a way that they deform in a controlled manner owing to the torsional forces occurring. The coordination between the closure parts 21 and 22 is adjustable through the torsional rigidity of the connecting elements 23.1, 23.2. The desired snap-on effect can thus be achieved by the closure parts or by the connecting elements individually or in combination with one another. Owing to the low torsional rigidity of the connecting elements 23.1 and 23.2, it is possible to achieve intermediate states in which the closure parts are stable relative to one another but do not assume tension-free positions. Closures having a plurality of open positions can thus be realized.

The closure parts are separated from one another by the gaps 33 to 38 so that the closure 20 can be opened and closed. The gaps 33 to 38 are formed in such a way that they are optimally accessible in the mould and can be removed from the mould. Coupling elements 39 are present in the gap 33 of the embodiment shown here. The coupling elements additionally connect the closure parts 21 and 22. The coupling elements 39 are designed in such a way that, if required, they serve as predetermined breaking points between lower closure part 21 and upper closure part 22 which are destroyed when the closure is first opened. The coupling elements 39 may also be in the form of all-round, membrane-like predetermined breaking points which enclose one or more desired sectors. A consumer can thus recognize whether the closure has already been opened before purchase (original warranty seal). The coupling elements 39 also serve for preventing unintentional opening during transport, since a greater force has to be overcome on opening for the first time. In addition to the above-mentioned points, the coupling elements 39 also serve as flow aids in the production of the closure 20, in order to achieve better filling of the mould. Instead of the coupling elements 39, other equivalent means (not shown) are also possible, for example in the form of tearoff lips, which have to be removed before opening for the first time, for example by tearing off Integrations of further functions are not hindered. The course of the gaps 33 to 38 can be substantially freely chosen provided that there is no impairment of the mode of operation of the closure and the producibility. The connecting elements 23.1 and 23.2 are preferably integrated into the outer contour of the closure parts 21 and 22. In the invention disclosed here, the design is subject to few limits, in contrast to the prior art. Here, the connecting elements 23.1 and 23.2 are adapted to the outer contour of the closure and are integrated therein. Of course, they may also have another design or may be flat. If required, they may have a connection to one another. An advantageous connection can be realized, for example, in the form of a further (straight) hinged connection, in the form of a film hinge in the case of plastics.

Figure 4:
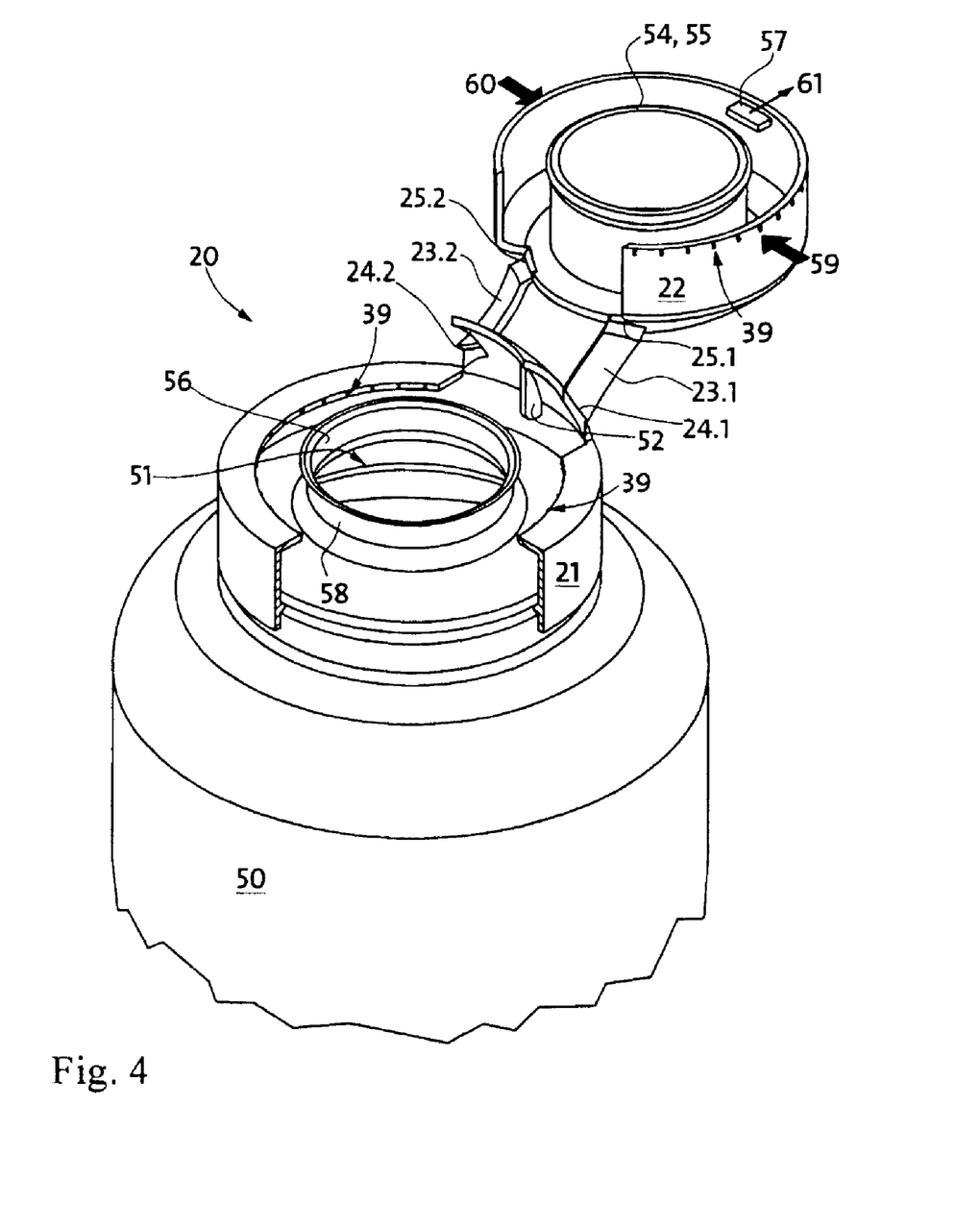
FIG. 4 shows a closure according to FIG. 3, in the open position.

FIG. 4 shows the closure 20 according to FIG. 3 in the opened position, in a perspective sectional view. Here, the closure 20 is pressed onto a bottle 50 and thereby fastened. Here, the upper closure part 22 is present in a stable open position swivelled 180° backwards so that a pouring opening 51 for pouring out the content contained in the bottle 50 is unobstructed. In the embodiment shown here, the upper closure part 22 is present in an oblique position above the lower closure part 21 so that it does not hinder pouring and the spout 51 is visually not concealed. Because the main hinge connection has been avoided according to the invention and owing to the length of the connecting elements 23.1, 23.2, it is possible to bring the upper closure part 22 into this position in a closed injection moulded closure 20. In the case of the closures known from the prior art, an upper closure part generally hinders pouring. The coupling elements 39 were destroyed here on deliberately opening the closure 20. Residues of the coupling elements 39 are therefore present both on the lower closure part 21 and on the upper closure part 22. It is thus safely indicated to a user that the closure 20 was opened at least once. The closure parts 21, 22, the connecting elements 23.1, 23.2, and the hinge connections 24.1, 24.2, 25.1, 25.2 are advantageously substantially tension-free in the open position of the closure 20 shown here. This means that the closure parts 21, 22, the connecting elements 23.1, 23.2 (except for the hinge connections 24.1, 24.2, 25.1, 25.2) are not subject to any deformations. In the interior of the closure 23, preferably in the region of the connecting elements 23.1 and 23.2, brace 52 for partial stiffening of the closure parts 21, 22, 23.1, 23.2 are present on the closure parts 21, 22, 23.1, 23.2. The snap-on behaviour and the functionality of the closure 20 are thus influenced in a controlled manner. Brace 52 for stiffening the closure parts are preferably constructed as a rib, thicker region or other equivalent structural element.

A tubular element 53 which in this case has an edge 55 thickened with a bead 54 is evident in the interior of the upper closure part 22. The tubular element 53 or the bead 54 corresponds, in a closed position of the closure 20, to the spout 51 of the bottle 50 or of an adapter between bottle and closure so that bottle 50 is sealed. The tubular element 53, the bead 54 and the spout 51 actively connected to them in the closed position of the closure 20 are advantageously designed in such a way that the sealing effect is adjusted proportionally to the internal pressure of the bottle 50. This can be achieved, for example, through the geometry of the tubular element 53 if the edge 55 or the bead 54 expands proportionally to the internal pressure and to a greater extent than the increase in the diameter of the spout 51. Consequently, the edge 55 is pressed to a greater extent against the inner wall 56 of the spout 51 with increasing internal pressure, with the result that the sealing effect is enhanced. A catch 57 is present on the inside of the upper closure part 22. In the closed position of the closure 20, this catch 57 has an active connection to a counter-element, in this case an outer edge 58 of the bottle 50, by virtue of the fact that it grips under counter-element 58 and thus prevents unintentional opening of the closure 20, for example during transportation or in the case of high internal pressures. This locking mechanism can be temporarily released here by lateral pressure on the upper closure part 22 in the direction of the arrows 59 and 60. As a result of the lateral pressure, the upper closure part is deformed in such a way that the catch 57 moves in the direction of an arrow 61 and the active connection with the outer edge 58 is temporarily broken. The closure 20 can thus be opened. The locking mechanism shown here is also particularly suitable for combination with a quality seal or original warranty seal in the form of a tearoff lip (not shown). Of course, it is also possible to use more than one catch 57 or to position said catch otherwise. The effective ranges of the pressures must be appropriately adjusted. Thus, the closure according to the invention can be used even in the case of high internal pressures.

Figure 5:
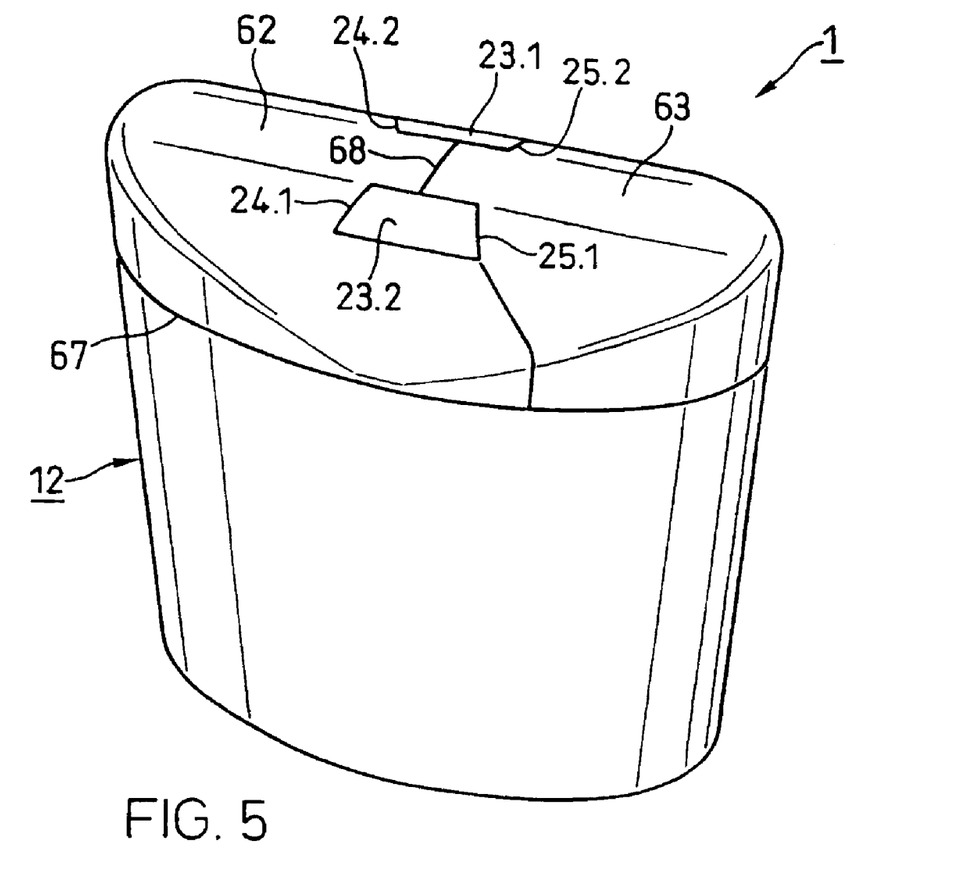
FIG. 5 shows a closed injection moulded closure with hinge connection arranged at the top.

FIG. 5 shows another embodiment of a closure 1 which is mounted on, preferably forced onto, a container 12. The closure comprises a first, fixed closure part 62 and a second, movable closure part 63. The container 12 may have, in the region of its upper end 67, a complete opening which substantially extends over its total cross-section, or, in the region of the movable closure part 63, by a smaller opening which appears as soon as the movable closure part 63 opens. Arranged in the region of the transition 68 between the two closure parts are two connecting elements 23.1, 23.2, which form the hinge connection between the two closure parts. In contrast to the closures described above, the connecting elements are arranged not by the side of the closure in an inclined surface but on the top of the closure (relative to the closure axis "A"). The geometry of the two connecting elements 23.1, 23.2 is preferably designed so that the movable closure part performs a snap-on movement of about 90° or 180°, the formula mentioned above in association with FIG. 2 being used to obtain the desired opening angle a. Of course, it is also possible to obtain other intermediate angles by corresponding modification of the hinge connections 24.1, 25.1 and 24.2, 25.2. The avoidance, according to the invention, of a main hinge in combination with the mutual arrangement of the closure parts permits such a closure having a large opening angle ω), as illustrated in FIG. 2.

The external geometry of the closure can have a convex shape, as shown here. However, closures in which the connecting elements are arranged in a depression or in which the external geometry is substantially concave can also be realized. The arrangement of the hinge connections in the upper region of the closure permits particularly advantageous hinges and predetermined breaking points for achieving an original warranty seal if, for example, the transition 68 between the two closure parts 62, 63 is not continuously separated but contains connections or connecting regions which have predetermined breaking points and are parted only on opening for the first time. According to the invention, it is possible to integrate the connecting elements 23.1, 23.2 completely into the closure contour so that a large number of closure designs are possible. For example, the movable closure part can be made smaller and can be surrounded by the fixed closure part so that, as a result of opening the movable closure part, an opening in the closure itself is achieved and the container is not opened along its upper edge (press-on bead, weld, etc.), in contrast to the situation in the examples shown in this figure. Such a design of the movable closure part is particularly advantageous when it is necessary to provide an original warranty seal where the lid part and container may not be detachable from one another at any point.

In particular embodiments, it is possible to provide more than two connecting elements 23.1, 23.2, and the arrangement of the further connecting elements should support the kinematics of the closure. The connecting elements can permit additional hinge movements, in accordance with solutions according to EP 0 746 512.

What is claimed is:

1. A closed injection moulded closure, comprising:
a first closure part;
a second closure part; and
two connecting elements connected to the first closure part and the second closure part by two pairs of hinge connections, each said pair of hinge connections having a first hinge connection and a second hinge connection, each said first hinge connection connecting upper sides of said connecting elements to said first closure part, each said second hinge connection connecting bottom sides of said connecting elements to said second closure part, each said pair of hinge connections making a first angle (φ) with one another and defining a plane, planes defined by said two pairs of hinge connections making a second angle (ω) with one another, wherein, in a closed position of the closure, each said plane is inclined relative to a central closure axis, and the two connecting elements and the two pairs of hinge connections are accessible in the mould from the inside of the closure and from the outside of the closure and can be removed from the mould;
said closed injection moulded closure being free from a main hinge connection between said first closure part and said second closure part.

2. The closed injection moulded closure according to claim 1, further comprised of the first and the second closure parts, in the closed position of the closure, functionally separated from one another by at least one gap.

3. The closed injection moulded closure according to claim 1, further comprised of the first and the second closure parts, in the closed position of the closure, connected by at least one coupling element which is destroyed or removed when the closure is opened for the first time.

4. The closed injection moulded closure according to claim 3, wherein said coupling element is a web or a tear-off lip.

5. The closed injection moulded closure according to claim 1, further comprised of the connecting elements in an opened position having no geometric deformations relative to an injection moulded state.

6. The closed injection moulded closure according to claim 1, wherein an opening angle (α) between the first closure part and the second closure part in an open position of the closure is 150° to 180°.

7. The closed injection moulded closure according to claim 1, wherein the relationship among an opening angle (α) between the first closure part and the second closure part in an open position of the closure, the first angle (ω) and the second angle (φ) is given by the following formula:

$$\phi = 2 \cdot \arctan\left[\frac{\sin(\alpha/2)}{1 - \cos(\alpha/2)} \cdot \sin(\omega/2)\right].$$

8. The closed injection moulded closure according to claim 1, further comprised of the connecting elements being integrated into outer contours of the first and the second closure parts.

9. The closed injection moulded closure according to claim 1, wherein the first closure part is adjacent to the second closure part and the first and the second closure parts are actively connected to a container, at least one closure part being detachably and actively connected to the container.

10. A closed injection moulded closure comprising:
a first closure part;
a second closure part; and
two connecting elements connected to the first closure part and the second closure part by two pairs of hinge connections, each said pair of hinge connections having a first hinge connection and a second hinge connection, each said first hinge connection connecting upper sides of said connecting elements to said first closure part, each said second hinge connection connecting bottom sides of said connecting elements to said second closure part, each said hinge connections making a first angle (φ) with one another, and defining two planes making a second angle (ω) with one another, wherein, in a closed position of the closure, each of said planes is inclined relative to a central closure axis and the two connecting elements and the two pairs of hinge connections are accessible in the mould from the inside of the closure and from the outside of the closure and can be removed from the mould;

each of said connecting elements having a shorter edge and a longer edge, said shorter edge being closer to an apex of said first angle (φ) than said longer edge and being pressure-resistant, said longer edge lengthening elastically and reversibly under a tensile stress; and said closed injection moulded closure being free from a main hinge connection between said first closure part and said second closure part.

11. The closed injection moulded closure according to claim 10, further comprised of said longer edge being of a three-dimensional curvature.

12. The closed injection moulded closure according to claim 1, further comprised of said two pairs of hinge connections being film hinge connections.

13. The closed injection moulded closure according to claim 1, further comprised of said first closure part having at least two stable positions including at least one open position and the closed position.

14. The closed injection moulded closure according to claim 1, wherein said first closure part has an open position, the closed position and at least one intermediate open position.

15. The closed injection moulded closure according to claim 3, further comprised of said coupling element having a predetermined breaking point.

16. The closed injection moulded closure according to claim 1, said two connecting elements connected to each other by means of a film hinge connection.

17. The closed injection moulded closure according to claim 1, further comprised of said first closure part having a tubular element on an inner side of said first closure part, said tubular element corresponding to an opening of the container, said tubular element sealing the opening of the container, said tubular element having an edge thickened by a bead.

18. A closed injection moulded closure, further comprising;

a first closure part;

a second closure part;

means for partially stiffening the first and the second closure parts; and two connecting elements connected to the first closure part and the second closure part by two pairs of hinge connections, each said pair of hinge connections having a first hinge connection and a second hinge connection, each said first hinge connection connecting upper sides of said connecting elements to said first closure part, each said second hinge connection connecting bottom sides of said connecting elements to said second closure part, each said hinge connections making a first angle (φ) with one another, and defining two planes making a second angle (ω) with one another, wherein, in a closed position of the closure, each of said planes is inclined relative to a central closure axis and the two connecting elements and the two pairs of hinge connections are accessible in the mould from the inside of the closure and from the outside of the closure and can be removed from the mould, said closed injection moulded closure being free from a main hinge connection between said first closure part and said second closure part.

19. The closed injection moulded closure according to claim 1, further comprised of said first closure part having a catch for preventing unintentional opening of the closure.

20. A closure for a container, comprising:

a first closure part;

a second closure part to be placed on the container, said first closure part opening and closing the container by moving relative to said second closure part;

at least two connecting elements connecting said first closure part and said second closure part, each said connecting element having a first side separated from a second side, by an intermediate third side spaced-apart from an intermediate fourth side, said fourth side being longer than said third side; and two pairs of hinge connections, each said pair of hinge connections comprising a first hinge connection and a second hinge connection, said first side of each said connecting element connected to said first closure part via said first hinge connection, said second side of each said connecting element connected to said second closure part via said second hinge connection, wherein in a closed position of the closure each said first hinge connection is closer to an axis of closure than are said second hinge connection, with said first closure part assuming at least two stable positions and assuming unstable positions between said at least two stable positions and with the two connecting elements and the two pairs of hinge connections being accessible in a mould from the inside of the closure and from the outside of the closure and being removable from the mould;

said closure being free from a main hinge connection between said first closure part and said second closure part.

21. The closure of claim 20, comprised of said two connecting elements and the two pairs of hinge connections being accessible in the mould from the inside of the closure and from the outside of the closure.

22. The closure of claim 20, wherein said third sides of said connecting elements are pressure-resistant.

23. The closure of claim 20, wherein, in a closed position of the closure, each said connecting element has a curved outer contour.

24. The closure of claim wherein said at least two connecting elements are integrated into an outer contour of the closure.

25. The closure of claim 20, wherein, in a closed position of the closure, said two connecting elements and said two pairs of hinge connections are in approximately stress-free states.

26. The closure of claim 20, wherein torsional rigidities of said third sides are higher than torsional rigidities of said fourth sides.

27. The closure of claim 20, comprising a coupling element coupling the first closure part and the second closure part, said coupling element being destroyed when the first closure part is separated from said second closure part for the first time.

28. The closure of claim 20, comprising an auxiliary connection between said two connecting elements.

29. The closure of claim 20, wherein said second closure part has a tubular element on an inner side of said second closure part, said tubular element has an edge thickened by a bead, and said tubular element has a shape corresponding to an opening of the container to act as a seal when in a closed position.

30. The closure of claim 20, further comprising means for partially stiffening the first and the second closure parts.

31. The closure of claim 20, further comprising a catch for preventing unintentional opening of the closure.

32. The closure of claim 20, wherein an opening angle between the first closure part and the second closure part in an open position of the closure is 150° to 180°.

33. The closure of claim 20, wherein a relationship among an opening angle ($\alpha$), a first angle ($\phi$) and a second angle ($\omega$) is given by the following formula:

$$\phi = 2 \cdot \arctan\left[\frac{\sin(\alpha/2)}{1 - \cos(\alpha/2)} \cdot \sin(\omega/2)\right]$$

where said opening angle ($\alpha$) is an angle between the first closure part and the second closure part in an open position of the closure;

said first angle ($\phi$) is defined by said first and said second hinge connections of each said pair of hinge connections; and said second angle ($\omega$) is an angle made by two planes, each of said two planes defined by each said pair of hinge connections.

34. A closed injection moulded process, comprising:

simultaneously moulding in a closed position, an entirety of a closure comprised of a first closure part mated in a closed position against a second closure part, and two connecting elements spaced-apart by an intermediate gap, connected to the first closure part and the second closure part by two pairs of hinge connections, each said pair of hinge connections having a first hinge connection and a second hinge connection, each said first hinge connection joining upper sides of said connecting elements to said first closure part, each said second hinge connection joining bottom sides of said connecting elements to said second closure part, each said pair of hinge connections making a first angle ($\phi$) with one another and defining a plane, the planes defined by said two pairs of hinge connections making a second angle ($\omega$) with one another, wherein, in the closed position of the closure, each said plane is inclined relative to a central closure axis, with the two connecting elements and the two pairs of hinge connections being accessible in the mould from the inside of the closure and from the outside of the closure; and removing the closure from the mould.

35. The process of claim 34, comprised of forming an opening angle between the first closure part and the second closure part to occur between approximately 150° to 180° while said first closure part is displaced from said closed position to an open position of the closure.

36. The process of claim 34, wherein a relationship among an opening angle ($\alpha$), said first angle ($\phi$) and said second angle ($\omega$) is given by a formula of:

$$\phi = 2 \cdot \arctan\left[\frac{\sin(\alpha/2)}{1 - \cos(\alpha/2)} \cdot \sin(\omega/2)\right]$$

where said opening angle ($\alpha$) is an angle between the first closure part and the second closure part while said first closure part is rotatably displaced from said closed position to an open position of the closure.

37. A closure for a container, comprising:

a lower closure part oriented to engage an opened end of the container;

an upper closure part disposed to assume at least two spatially defined and stable positions relative to said lower closure part; and two connecting elements spaced-apart by an intermediate gap, joining said lower closure part and said upper part by two pairs of hinge connections, each said pair of hinge connections having a first hinge connection and a second hinge connection, each said first hinge connection joining upper sides of said connecting elements to said upper closure part, each said second hinge connection joining bottom sides of said connecting elements to said lower part, with a first angle ($\phi$) occurring between said first and said second hinge connections of each said pair of hinge connections and each of said pair of hinge connections defining a plane with a second angle ($\omega$) occurring between each said plane, with each said plane being inclined relative to a closure axis of said closure, the two connecting elements and the two pairs of hinge connections being accessible in a mould from the inside of the closure and from the outside of the closure and being removable from the mould;

said closure being free from a main hinge connection between said first closure part and said second closure part.

38. The closure of claim 37, comprised of said upper closure part forming an opening angle with said lower closure part between approximately 150° to 180° while said upper closure part is displaced from a closed position mating with said lower closure part, to an open position of the closure.

39. The closure of claim 37, wherein a relationship among an opening angle ($\alpha$), said first angle ($\phi$) and said second angle ($\omega$) is given by a formula of:

$$\phi = 2 \cdot \arctan\left[\frac{\sin(\alpha/2)}{1 - \cos(\alpha/2)} \cdot \sin(\omega/2)\right]$$

where said opening angle ($\alpha$) is an angle between the first closure part and the second closure part while said first closure part is rotatably displaced from said closed position to an open position of the closure.

40. A closure for a container, comprising:

a lower closure part oriented to engage an open end of the container;

an upper closure part disposed to mate with said lower closure part, along a peripheral junction that forms a demarcation between said lower closure part and said upper closure part when said closure is in a closed position of said closure, and joined to said lower closure part by at least one frangible element traversing said peripheral junction while said closure maintains a virginity of said closed position; and two connecting elements spaced-apart by an intermediate gap movably joining said lower closure part and said upper part by two pairs of hinge connections, each said pair of hinge connections having a first hinge connection and a second hinge connection, each said first hinge connection joining upper sides of said connecting elements to said upper closure part, each said second hinge connection joining bottom sides of said connecting elements to said lower part, with a first angle (ϕ) occurring between said first and said second hinge connections of each said pair of hinge connections and each of said pair of hinge connections defining a plane with a second angle (ω) occurring between each said plane, with each said plane being inclined relative to a central closure axis of said closure, and the two connecting elements and the two pairs of hinge connections being accessible in a mould from the inside of the closure and from the outside of the closure, with the closure being removable from the mould.

41. The closure of claim 40, comprised of an opening angle formed between the first closure part and the second closure part to extend between approximately 150° to 180° while said first closure part is displaced from said closed position to an open position of the closure.

42. The closure of claim with said closure providing a relationship among an opening angle (α), said first angle (ϕ) and said second angle (ω) given by a formula of:

$$\phi = 2 \cdot \arctan\left[\frac{\sin(\alpha/2)}{1 - \cos(\alpha/2)} \cdot \sin(\omega/2)\right]$$

where said opening angle (α) is an angle between the first closure part and the second closure part while said first closure part is rotatably displaced from said closed position to an open position of the closure.

43. A closed injection moulded process, comprising: simultaneously moulding in a closed position, an entirety of a closure comprised of a first closure part mated in a closed position against a second closure part along a peripheral junction that forms a demarcation between said lower closure part and said upper closure part, and joined to said lower closure part by at least one frangible element traversing said peripheral junction while said closure maintains a virginity of said closed position; and two connecting elements spaced-apart by an intermediate gap, connected to the first closure part and the second closure part by two pairs of hinge connections, each said pair of hinge connections having a first hinge connection and a second hinge connection, each said first hinge connection joining upper sides of said connecting elements to said first closure part, each said second hinge connection joining bottom sides of said connecting elements to said second closure part, each said pair of hinge connections making a first angle (ϕ) with one another, and defining a plane, the planes defined by said two pairs of hinge connections making a second angle (ω) with one another, wherein, in the closed position of the closure, the planes are inclined relative to a closure axis, with the two connecting elements and the two pairs of hinge connections being accessible in the mould from the inside of the closure and from the outside of the closure; and removing the closure from the mould.

44. The process of claim 43, comprised of forming an opening angle between the first closure part and the second closure part to occur between approximately 150° to 180° while said first closure part is displaced from said closed position to an open position of the closure.

45. The process of claim 43, wherein a relationship among an opening angle (α), said first angle (ϕ) and said second angle (ω) is given by a formula of:

$$\phi = 2 \cdot \arctan\left[\frac{\sin(\alpha/2)}{1 - \cos(\alpha/2)} \cdot \sin(\omega/2)\right]$$

where said opening angle (α) is an angle between the first closure part and the second closure part while said first closure part is rotatably displaced from said closed position to an open position of the closure.

* * * * *